United States Patent
Hildebrand et al.

(10) Patent No.: US 6,321,775 B1
(45) Date of Patent: Nov. 27, 2001

(54) COMPRESSED GAS MANIFOLD

(75) Inventors: Richard J. Hildebrand, Edgemere; John J. Wozniak, Columbia, both of MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/427,784

(22) Filed: Oct. 27, 1999

Related U.S. Application Data

(60) Provisional application No. 60/105,889, filed on Oct. 27, 1998.

(51) Int. Cl.⁷ .................................................... B67D 5/04
(52) U.S. Cl. .............................................. 137/266; 137/79
(58) Field of Search ............................... 137/72, 79, 263, 137/266, 351; 220/581

(56) References Cited

U.S. PATENT DOCUMENTS

| | | | |
|---|---|---|---|
| 2,011,347 | * | 8/1935 | Ragonnet .......................... 137/266 X |
| 2,968,161 | * | 1/1961 | Bliss .................................. 137/79 X |
| 3,929,109 | * | 12/1975 | Chamberlain ....................... 123/468 |
| 4,416,227 | | 11/1983 | Imamura . |
| 4,978,148 | | 12/1990 | Kosugi et al. . |
| 5,042,520 | * | 8/1991 | Reznik ................................. 137/79 |
| 5,284,267 | * | 2/1994 | Polletta ............................. 220/581 X |
| 5,577,630 | * | 11/1996 | Blair et al. ........................... 220/581 |
| 5,603,360 | | 2/1997 | Teel . |
| 5,632,250 | | 5/1997 | Kato et al. . |
| 5,676,180 | | 10/1997 | Teel . |
| 5,701,928 | * | 12/1997 | Aoki ................................. 137/351 X |
| 5,704,387 | | 1/1998 | Sims . |
| 5,813,429 | * | 9/1998 | Ohtaka et al. ....................... 137/266 |

OTHER PUBLICATIONS

DOT –"Federal Motor Vehicle Safety Standards; Fuel System Integrity of Compressed Natural Gas Vehicles; Compressed Natural Gas Fuel Container Integrity" –Dec. 19, 1994.
DOT –"Federal Motor Vehicle Safety Standards; Compressed Natural Gas Fuel Container Integrity" –Dec. 28, 1994.
DOT –"Federal Motor Vehicle Safety Standards; Fuel System Integrity of Compressed Natural Gas Vehicles" –Apr. 25, 1994.
Dept. of Energy –Advanced Automotive Technologies Annual Report to Congress –Fiscal Year 1996 (Mar. 1998).
ICNGI/Lincoln Composites –ISS –Novel Compressed Natural Gas Storage System for Automotive Applications approx. Jan. 22, 1999.
Lincoln Composites –NGV Fuel Tank Inspection Guidelines – 1994/1996.
NFPA 52 –Compressed Natural Gas (CNG) Vehicular Fuel Systems 1992 Edition.
Compressed Gas Association, Inc. –Pressure Relief Device Standards Part 1 –Cylinders for Compressed Gas CGA S–1.1—1994.
Proposed Revision to American National Standard for Basic Requirements for Compressed Natural Gas Vehicle (NGV) Fuel Containers –Mar. 1, 1995.

(List continued on next page.)

*Primary Examiner*—John Rivell
(74) *Attorney, Agent, or Firm*—Francis A. Cooch

(57) ABSTRACT

A compressed gas storage cell interconnecting manifold including a thermally activated pressure relief device, a manual safety shut-off valve, and a port for connecting the compressed gas storage cells to a motor vehicle power source and to a refueling adapter. The manifold is mechanically and pneumatically connected to a compressed gas storage cell by a bolt including a gas passage therein.

5 Claims, 3 Drawing Sheets

OTHER PUBLICATIONS

Basic Requirements for Compressed Natural Gas Vehicle (NGV) Fuel Containers –ANSI/AGA –NGV2–1992.

EnV'98 Alternative Fuel Vehicles Advanced Natural Gas Vehicle Project –Johns Hopkins University, J.J. Wozniak et al. EnV'98 Environmental Vehicles & Alternative Fuels Conf., Jun. 15–17, 1998, Ypsilanta MI.

Advanced Natural Gas Vehicle Development –Johns Hopkins University, J.J. Wozniak et al., vol. 16 No. 1 (1995).

The Application of Scrimp Vartm Fabrication Technology to the Compressed Natural Gas Integrated Storage System Wienhold, P. et al, SAMPE J., 34(1) (Jan./Feb. 1998).

Development of an Integrated Storage System for a Mid–Size Automobile, Johns Hopkins University, Dale Tiller et al., May 26–28, 1998 Cologne, Germany.

Advanced Natural Gas Vehicle Program John Hopkins University, J. Wozniak et al. (1997).

* cited by examiner

US 6,321,775 B1

COMPRESSED GAS MANIFOLD

CROSS-REFERENCE TO RELATED APPLICATION

This application claims the benefit of prior filed copending U.S. provisional application serial No. 60/105,889, filed Oct. 27, 1998.

STATEMENT OF GOVERNMENTAL INTEREST

This invention was made with Government support under Contract No. DE-FG02-95CE5042 awarded by the U.S. Department of Energy. The Government has certain rights in this invention.

BACKGROUND OF THE INVENTION

1. Field of the Invention

The present invention relates to a compressed gas manifold for pneumatically interconnecting a plurality of gas storage cells.

2. Background

Domestic oil production is declining due to U.S. oil reserves becoming more difficult to tap while demands on petroleum production escalate. Half of the U.S. oil supply is imported and the U.S. Department of Energy predicts a 60 percent deficiency by the year 2010. International oil companies relying on easily extracted foreign oil may meet the demand but at an unacceptable cost to the U.S. economy. The primary cause of the short fall is the motor vehicle. Current predictions indicate motor vehicles will proliferate globally from 500 million today to one billion by the year 2030. The solution is obvious, alternative fuels must be developed for motor vehicles.

It has been demonstrated that compressed gasses such as hydrogen, propane, methane or natural gas are viable alternatives to petroleum as a fuel source for motor vehicles. Natural gas is one of the more interesting of the alternatives because it is a plentiful commodity in the United States and therefor inexpensive. As a result, more than 30,000 natural gas vehicles are being used in the United States. These vehicles have demonstrated low fuel costs and reduced engine maintenance while affording a significant reduction in exhaust emissions. Such vehicles have been restricted to fleet trucks, delivery vans, buses and taxis due to their limited range. The restrictions and limitations are caused by the space required for existing compressed natural gas fuel systems. This space penalty results in lost truck bed volume, automobile trunk volume and range. Furthermore, a higher initial purchase price is experienced due to the low demand for such vehicles. The resulting small population has made research and development unattractive so improvements have been slow to evolve.

BRIEF SUMMARY OF THE INVENTION

The present invention comprises a manifold for a compressed gas motor vehicle fuel storage system incorporating a plurality of compressed gas storage cylinders (pressure cells). The manifold includes an automatic thermally activated safety venting system, a manual shut-off valve, and a port for connecting the fuel storage system to the motor vehicle engine intake manifold and to a refueling port. An integrated embodiment of the invention is also described.

A primary objective of the present invention is to provide a fuel distribution manifold for a compressed gas fuel system for a motor vehicle which utilizes a plurality of pressure cells contained within a protective housing.

Another objective of the invention is to provide a gas manifold for refueling pressure cells, supplying gas to the vehicle engine and providing for the safe, controlled venting of the fuel system in event of a fire.

A further objective of the invention is to provide a manifold for interconnecting a plurality of compressed gas storage cells and controlling the flow of gas therefrom to a vehicle engine.

A still further objective of the invention is to provide a manifold for a compressed gas storage system which incorporates an automatic, controlled venting system to safely reduce tank pressure before the tanks explode in the event of a fire.

DETAILED DESCRIPTION OF THE INVENTION

The anticipated primary application of the present invention is as a gas distribution manifold assembly for a compressed gas fuel storage system for automobiles, vans and light duty trucks such as sport utility vehicles and pickups. The manifold assembly is designed to be used with compressed fuel gasses such as hydrogen, propane, methane, natural gas, or any other gas which may be burned as a fuel source in a motor vehicle engine. It may be used with any number of pressure cells but the preferred embodiment presented as the exemplary best mode of the invention is designed to operate with three pressure cells.

Figure 1:
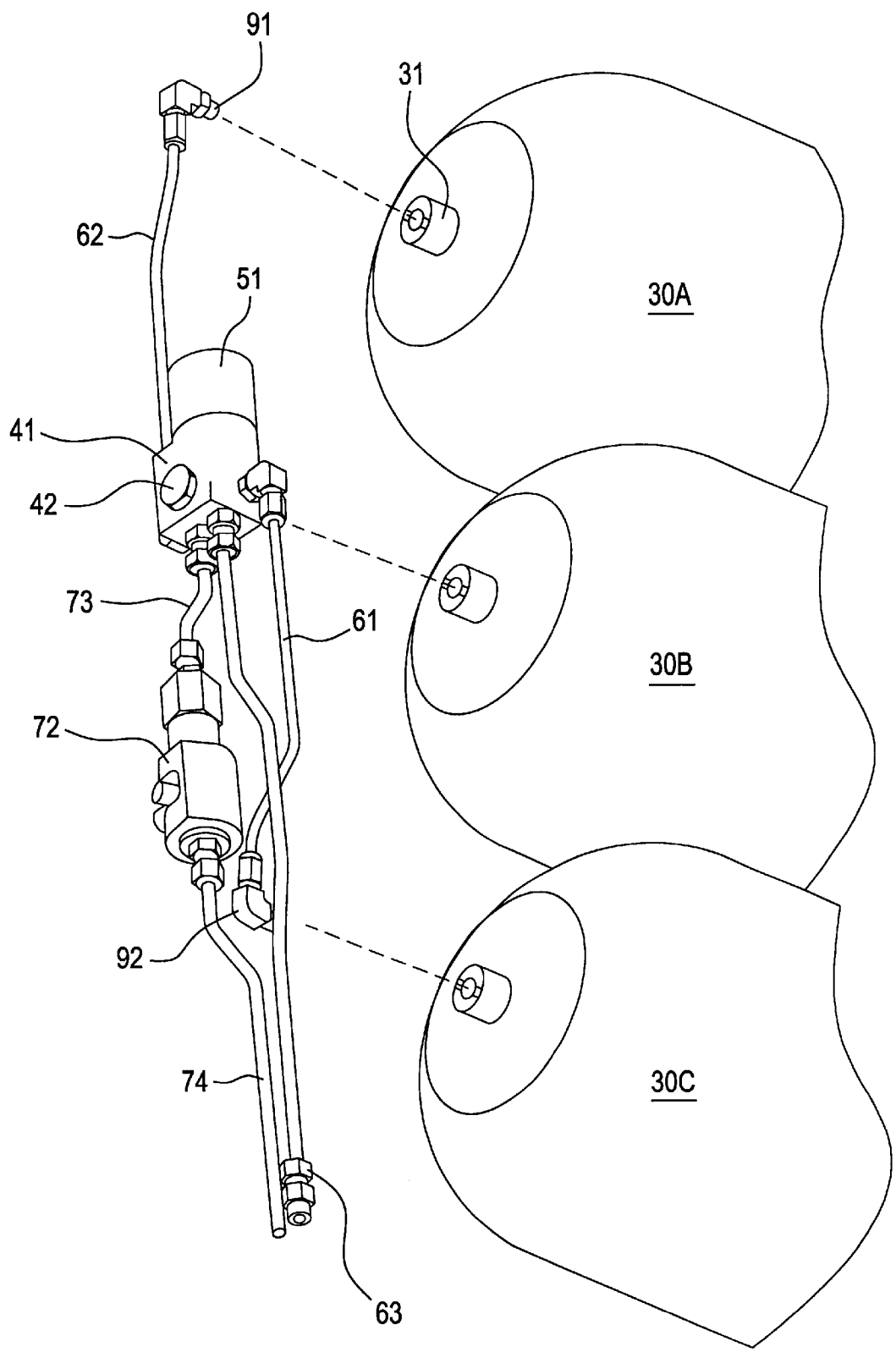
FIG. 1 is a perspective view of the manifold assembly including the manifold, safety valve, tank connectors and related tubing illustrating the assembly's relative positioning to a plurality of fuel cells.

FIG. 1 illustrates the manifold assembly of the present invention as it relates to an integrated fuel storage system comprising three compressed gas cylinders, 30A, 30B and 30C. Each pressure cell includes an inlet/outlet port 31 which is a bushing into which the manifold assemblies tank fittings 91, 42 and 92, respectively, are threaded.

Figure 2:
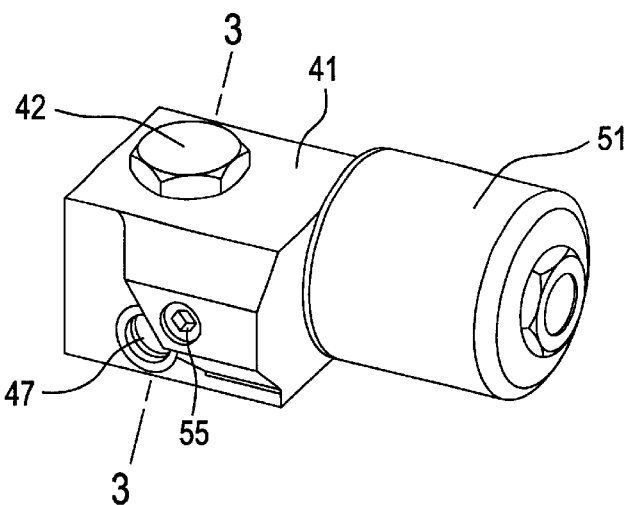
FIG. 2 is a three-quarter perspective view of the manifold.
Figure 3:
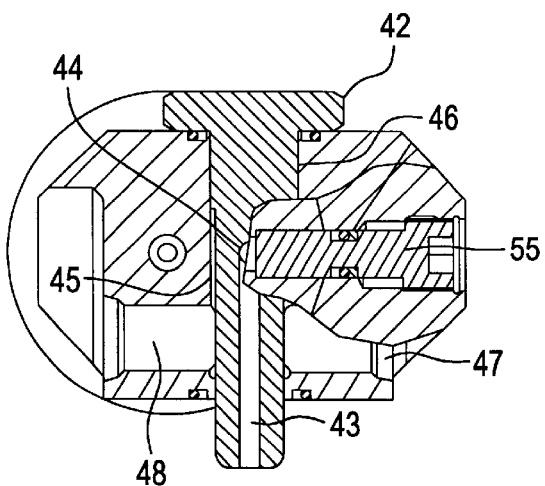
FIG. 3 is a plan cut-away view of the manifold taken along the line A—A of FIG. 2.
Figure 4:
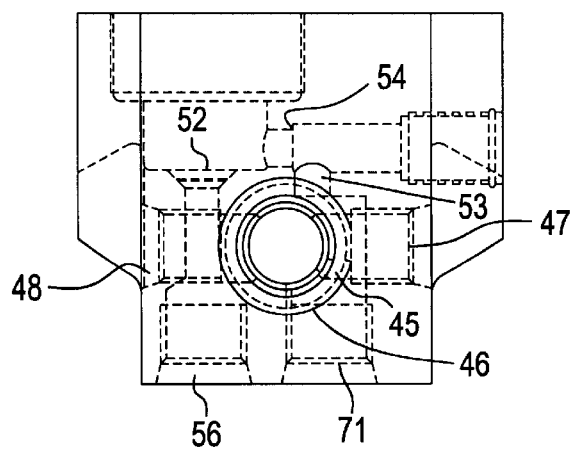
FIG. 4 is a phantom view illustrating the passages within the manifold as view from top of FIG. 2.

The manifold assembly is comprised of a manifold 41 which interconnects the three pressure cells in the preferred embodiment. The manifold 41 incorporates a valve 52 (FIG. 4) controlled by a solenoid, 51, which is controlled by the vehicle's electrical system. The gas flow control features of the manifold 41 and solenoid controlled valve may best be understood with reference to FIGS. 2 through 4.

The manifold, 41, is connected to the inlet/outlet port 31 of the center pressure cell, 30B. This connection is accomplished by bolt 42 which has an axially centered bore 43. The bore terminates in a transverse bore 44 forming a "T" shaped passage through the bolt. With the bolt 42 threaded into the inlet/outlet port of the center pressure cell, gas flows through the axial bore 43 and the transverse bore 44 into distribution gallery 45 which is formed by an enlarged section of the bore 46 through which bolt 42 passes. The distribution gallery 45 provides a gas passage to coupling ports 47 and 48 which are connected via conventional high-pressure fittings and stainless steel tubing assemblies 61 and 62 to the inlet/outlet ports 31 of pressure cells 30C and 30A by fittings 92 and 91, respectively. Thus all three pressure cells are pneumatically interconnected by way of the distribution gallery 45 of the manifold 41.

Distribution gallery 45 is connected to the solenoid valve seat 52 by port 53 through the manual shut-off valve seat 54. The shut-off valve is comprised of a valve seat 54 and associated bore and the shut-off valve 55 which is threaded into the shut-off valve bore. The manual shut-off valve provides a means to stop gas flow from the pressure cells into the vehicle fuel system via the solenoid valve seat 52 and inlet/outlet port 56. The inlet/outlet port 56 is coupled to a vehicle gas flow control valve and fuel system by a conventional high-pressure fittings and stainless-steel tubing assembly 63. The vehicle gas flow control may include an ancillary system which allows gas flow in a mutually exclusive fashion from the manifold 41 to the vehicle engine or from a compressed gas supply source into the pressure cells via the manifold 41 in a refueling mode.

A safety vent port 71 is pneumatically coupled to the distribution gallery 45. The safety vent port 71 is pneumatically connected to a thermally responsive safety valve 72 by conventional high-pressure fittings and stainless-steel tubing assembly 73. The thermally responsive safety valve 72, i.e., pressure relief device, opens to vent the pressure cells at a controlled rate in the event of a vehicle fire in the fuel storage area. During emergency venting, the fuel escaping from the thermally responsive safety valve 72 by way of the safety vent tube assembly 74 will bum if ignited but the resulting flame will be nondestructive due to the location of the opening of the vent tubing assembly which is directed away from the vehicle.

Figure 5:
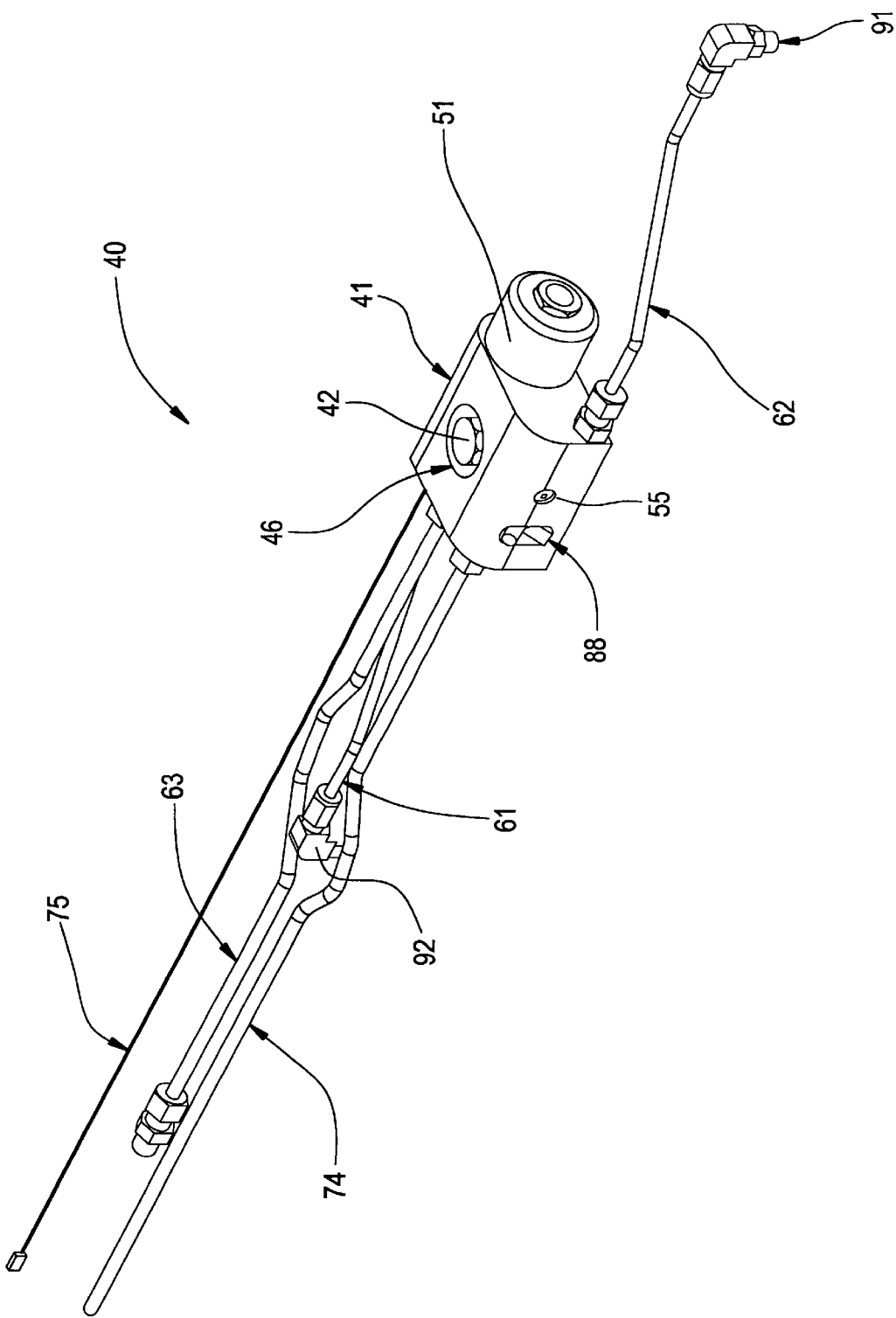
FIG. 5 illustrates a more integrated embodiment of the invention.

As shown in FIG. 5, an integrated embodiment of the gas control manifold assembly, 40, is comprised of a gas distribution manifold, 41, which, in the preferred embodiment, is a machined or cast and turned metal block that interconnects all of the pressure cells of the ISS, pressure cell pneumatic connection line assemblies, 61, 62, a safety vent tube, 74, and a supply tube 63. The gas distribution manifold, 41, incorporates a solenoid valve, 51, which is controlled by the vehicle electrical system and controls a pneumatic passage between the supply line and pressure cells via the pressure cell pneumatic connection line assemblies, 61, 62, and pneumatic connecting bolt, 42.

The gas flow control features of the gas control assembly, 40, may best be understood with reference to FIG. 5. The distribution manifold, 41, is connected to the inlet/outlet port, 31, of the center pressure cell. This connection is accomplished by pneumatic connecting bolt, 42, which physically secures the manifold to the pressure cell assembly and provides a pneumatic passage to one of the pressure cells. Pneumatic connecting bolt 42 has an axially centered bore. The bore begins at the threaded end and terminates in a transverse bore before reaching the bolt head forming a "T" shaped passage through the bolt. The bolt, 42, passes through a bore, 46, traversing the manifold, 41, and when its end is threaded into the inlet/outlet port 31 of the center pressure cell, gas flows through the axial and transverse bores of the bolt and into a distribution gallery formed in the manifold, 41, and through which bolt, 42, passes. The distribution gallery provides a gas passage to ports which are connected via conventional hi-pressure fittings and stainless steel tubing forming the pressure cell pneumatic connection line assemblies, 61, 62, to the inlet/outlet ports, 31, of the other pressure cells. Thus, all three pressure cells are pneumatically interconnected by the distribution gallery of manifold, 80.

The manifold distribution gallery is also connected to the supply tube, 63, through a manual shut-off valve, 55, and the solenoid valve, 51. The shut-off valve is comprised of a valve seat, associated bore and the shut-off valve stem, which is threaded into the shut-off valve bore. The manual shut-off valve provides a means to stop gas flow from the pressure cells into the vehicle fuel system via the solenoid valve, 51, and supply tube, 63. The supply tube, 63, is coupled to the vehicle refueling port and the engine fuel supply by conventional high-pressure fittings and stainless steel tubing.

The distribution manifold, 41, incorporates a thermally responsive pressure relief device (PRD). The PRD is pneumatically coupled to the manifold gallery. The PRD opens to vent the gas at a controlled rate through the safety vent tube, 74, in the event of a vehicle fire involving the fuel storage area. The PRD is activated when a eutectic metal alloy inside redundant triggers, 88, melts as a result of exposure to the heat of flame.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. A compressed gas fuel system manifold assembly, comprising:

a manifold;

a plurality of gas passages within said manifold;

a bolt for mechanically connecting said manifold to a compressed gas storage cell;

said bolt including an axial passage beginning at the threaded end and terminated in a passage through the body of the bolt shaft oriented perpendicular to said axial passage;

a bore through said manifold including an increased diameters segment forming a distribution gallery through which said bolt passes to mechanically and pneumatically connect said manifold to a gas storage cell;

said bore positioned to pass through a section of said manifold whereby said distribution gallery pneumatically interconnects said plurality of gas passages; and a separate gas conduit for creating a pneumatic coupling between each of a plurality of gas storage cells and said plurality of gas passages.

2. A manifold assembly as defined by claim 1, including a thermally responsive means for venting said gas storage cells.

3. A vehicle fuel system as defined by claim 2, wherein said manifold comprises:

an inlet/outlet port;

a primary gas passage for coupling said distribution gallery to said inlet/outlet port;

a control valve for selectively opening and closing said primary gas passage to said inlet/outlet port;

a solenoid for operating said control valve;

a manually operated valve for selectively opening and closing said primary gas passage between said distribution gallery and said control valve; and conduit means coupling said inlet/outlet port to the intake manifold of an engine of a vehicle and to the refueling port of the vehicle.

4. A compressed gas control integrated manifold assembly comprising:

a distribution manifold;

coupling means for pneumatically connecting said compressed gas pressure cells to said manifold;

a solenoid operated control valve for selectively providing a pneumatic passage through said manifold from said supply line to said compressed gas pressure cells via said coupling means;

a manually operated valve for selectively opening and closing said pneumatic passage; and a thermally responsive means for venting said pressure cells incorporated into said manifold, said thermally responsive means being pneumatically coupled to said manifold.

5. A compressed gas control integrated manifold assembly as defined by claim 4, wherein said coupling means comprises:

a bolt securing said manifold to one of said compressed gas pressure cells, said bolt comprising a pneumatic passage in the threaded end for pneumatically coupling said one of said compressed gas pressure cells to said manifold; and pneumatic lines connecting the remaining ones of said compressed gas pressure cells to said manifold.

* * * * *